United States Patent
Iyer et al.

(10) Patent No.: US 8,941,711 B2
(45) Date of Patent: Jan. 27, 2015

(54) EXTENDED PRESENCE FOR VIDEO CONFERENCING SYSTEMS

(75) Inventors: Balaji Iyer, Austin, TX (US); Guruprasad Subbarao, Austin, TX (US); Ken Faubel, Dunstable, MA (US)

(73) Assignee: Polycom, Inc., San Jose, CA (US)

( * ) Notice: Subject to any disclaimer, the term of this patent is extended or adjusted under 35 U.S.C. 154(b) by 213 days.

(21) Appl. No.: 13/586,232

(22) Filed: Aug. 15, 2012

(65) Prior Publication Data

US 2012/0306996 A1    Dec. 6, 2012

Related U.S. Application Data

(63) Continuation of application No. 12/483,493, filed on Jun. 12, 2009, now Pat. No. 8,330,795.

(60) Provisional application No. 61/061,442, filed on Jun. 13, 2008.

(51) Int. Cl.
*H04N 7/14* (2006.01)

(52) U.S. Cl.
USPC .................................. 348/14.08; 379/202.01

(58) Field of Classification Search
USPC ............... 379/93.21, 158, 202.01; 348/14.01, 348/14.08, 14.04
See application file for complete search history.

(56) References Cited

U.S. PATENT DOCUMENTS

| | | | |
|---|---|---|---|
| 5,483,588 A * | 1/1996 | Eaton et al. | 379/202.01 |
| 7,570,752 B2 * | 8/2009 | Jachner | 379/202.01 |
| 7,620,160 B2 | 11/2009 | Tidwell et al. | |
| 7,720,952 B2 | 5/2010 | Miyata et al. | |
| 7,848,265 B2 | 12/2010 | Levy et al. | |
| 7,961,667 B2 | 6/2011 | Perzy et al. | |
| 8,041,015 B2 | 10/2011 | Jachner | |
| 8,234,366 B2 * | 7/2012 | Suryanarayana et al. | 709/224 |
| 2006/0101143 A1 | 5/2006 | Garcia et al. | |
| 2007/0011239 A1 | 1/2007 | Fujioka | |
| 2007/0036318 A1 | 2/2007 | Gits et al. | |
| 2007/0117508 A1 | 5/2007 | Jachner | |
| 2008/0019300 A1 | 1/2008 | Perzy et al. | |
| 2008/0120427 A1 | 5/2008 | Ramanathan et al. | |
| 2008/0133675 A1 | 6/2008 | Ramanathan et al. | |
| 2008/0163075 A1 | 7/2008 | Beck et al. | |
| 2008/0281914 A1 | 11/2008 | Miyata | |
| 2008/0310607 A1 | 12/2008 | Jachner | |
| 2009/0210802 A1 | 8/2009 | Hawkins et al. | |
| 2010/0149307 A1 | 6/2010 | Iyer et al. | |
| 2010/0191802 A1 | 7/2010 | Miyata et al. | |

* cited by examiner

*Primary Examiner* — Olisa Anwah
(74) *Attorney, Agent, or Firm* — Wong, Cabello, Lutsch, Rutherford & Brucculeri, L.L.P.

(57) ABSTRACT

Systems and methods of providing extended presence information for multi-user devices are described. Communication devices used in conference rooms represent a different nature than single user devices such as a personal computer. Conference rooms also have attributes that may be added to existing presence information and provide an enhanced experience for scheduling and dissemination of conference room capabilities. Information such as actual people in attendance may be added to the presence information maintained by a presence server to provide an overall enhancement to the meeting room whether it is physically a single conference room or a multitude of endpoints remotely connected to a conference.

35 Claims, 8 Drawing Sheets

EXTENDED PRESENCE FOR VIDEO CONFERENCING SYSTEMS

CROSS REFERENCE TO RELATED APPLICATIONS

This application is a continuation of and claims priority to U.S. patent application Ser. No. 12/483,493 entitled "Extended Presence for Video Conferencing Systems" by the same inventors as this application filed 12 Jun. 2009 which claims priority to U.S. Provisional Application Ser. No. 61/061,442 entitled "Extended Presence for Video Conferencing Systems" filed 13 Jun. 2008 each of which is incorporated by reference herein.

FIELD OF DISCLOSURE

This disclosure relates generally to the field of video conferencing. More particularly, but not by way of limitation, to a method of maintaining extended presence information in a presence server and exchanging extended presence information between a presence server and a conferencing device. The extended presence information may be associated with conferencing equipment and conference participants. The extended presence information may also be provided to a presence server for publication in real-time or near real-time.

BACKGROUND

Presence information can be defined as the information pertaining to a person's availability to communicate at a given point in time. It may, for example, be used to evaluate a persons online status for instant messaging (IM) or other type of communication (e.g., online to receive email, do not disturb, offline).

A Presence Server can collect, store, and distribute status information about users (i.e., Presence Information). The information can originate from several different devices, for example from mobile phones, laptop computers, PDAs, desktop PCs, or even other application servers. The Presence Server can correlate this information to form a complete view of each user's presence information. It can then send the combined presence data to one or more "watchers" who have subscribed to the presence of a particular user. Thus, a Presence Server can act as an intelligent abstraction layer for communications related to presence performing functions such as:

1. managing connections from or sessions for authorized clients, servers, and other entities;
2. routing appropriately-addressed presence messages among such entities; and
3. receiving presence information from its clients and make this information available to entities (other clients) that subscribe to presence updates for a given set of clients.

In modern business organizations it is not uncommon for groups of geographically dispersed individuals to participate in audio conferences, video conferences, data conferences (e.g., via NetMeeting or WebEx) or some combination thereof. Scheduling such conferences, e.g., coordinating contact times and equipment availability may at times be problematic. Furthermore, after a conference begins, current conference systems typically only notify the participants when a new "far end" joins or leaves the conference. No notification is given if another individual arrives at or departs from an already connected "far end."

Therefore, what is needed is a system and method for adding presence information and extended presence information (defined below) to conferencing network devices, meeting locations and other multi-user devices to enhance user awareness of availability of shared resources. Furthermore, by extending presence information it may be possible to make users aware of capabilities of shared user devices and thus optimize meeting scheduling and use of corporate assets. Additionally, with extended presence information being shared amongst conferencing locations while conferencing is taking place, security may also be enhanced. This is because each location may be able to determine, in real-time or near real-time, exactly which individuals are present at each "far end" location even if these individuals arrive or leave during the conference.

SUMMARY

In one embodiment, a conferencing system device uses presence information to enhance user experience in the context of a video conference. In this embodiment, the conferencing system device is configured with a programmable processing unit programmed to provide extended presence information pertaining to resources utilized by the conference and participants in the conference. The extended presence information can facilitate optimization of scheduling corporate resources. Extended presence information associated with meeting participants may further enhance the ability to get key resources scheduled for a meeting in an efficient manner. Thus, an efficient system for scheduling, coordinating and enhancing a corporate conference environment can be provided.

In another embodiment, a conferencing device uses presence information available from a plurality of remote devices. The conferencing device can then monitor a composite of specific resources and personnel and alert a meeting subscriber when all requested resources and personnel are available for a conference. Thus, scheduling an ad hoc meeting can be automated and optimized such that the time of the meeting coordinator and required participants are optimized.

DETAILED DESCRIPTION

The following disclosure describes "presence based applications" in the context of video conferencing systems pertaining to conference rooms, endpoints and individuals as a non-limiting example. One of ordinary skill in the art will recognize that the inventive nature of this disclosure may be extended to other types of multi-user resources (and devices supporting those resources) that are shared throughout a community or a business organization, such as but not limited to, lecture halls, hotel suites, shared offices, etc. The embodiments disclosed herein are described using the eXtensible Markup Language (XML) and a protocol to transfer information between devices. One such protocol is the eXtensible Messaging and Presence Protocol (XMPP) standard protocol as defined in RFC 3920 and RFC 3921. One of ordinary skill in the art will further recognize that other techniques of coding data and different protocols for sending data could also be used.

While the model of real-time presence is commonly applied in the context of personal computers or single user devices, there is a need for a system to provide presence information for communication devices that are a shared resource not necessarily owned or used exclusively by a single individual. Disclosed are methods and embodiments that may be used to extend presence information to multi-user devices and conference rooms. In a particular embodiment, video conferencing devices are described that convey properties of a conference room, such as, its state of presence, its size, its ability to provide scheduling information, conference room equipment, people currently in the conference room, its ability to facilitate or launch conferences, etc.

As used herein, a "conference" can be any combination of one or more endpoints configured to facilitate simultaneous communication amongst a group of people including audio, video, and/or data conferences. Also, as used herein, a "conferencing entity" refers to devices, participants, conference rooms, and other things that may be scheduled to participate in a conference. Typically, a conference will include a subset of the available people (i.e., meeting invitees) and a subset of the available technical and physical infrastructure. Technical infrastructure can include networks, bridging devices, multi-point control units, end point devices, etc. Note that some parts of the technical infrastructure will be capable of supporting multiple conferences at the same time while other parts of the technical infrastructure will be limited to a single conference at a time. Physical infrastructure can include offices, conference rooms, and other places where conference participants may be physically present.

Additionally, physical conference rooms may contain video/audio equipment and other physical and technical capabilities used to communicate with other such conference rooms or individuals. The attributes of a physical conference room and/or the technical capabilities of the equipment residing therein may be added to the extended presence information to further inform users of each location's capabilities. For example, the size of the conference room or number of occupants it can support might be useful information. Alternatively, parameters of the equipment, such as display size, number of displays, capabilities for display of presentation content in addition to video content of participants, stereo sound, etc. may also be of use and therefore can be advantageously included in the extended presence information.

Typically, all XMPP endpoints are assumed to be capable of expressing basic presence and the ability to receive, display, gather, and send instant messages. Because some appliance endpoints do not have a keyboard or a practical method of gathering text input for instant messaging, there exists the problem that other XMPP stations might assume that an appliance system can participate in an instant messaging session. However, when an instant message is sent to an appliance or other device without input capability, the message is ignored.

To address this limited capability, an extended technique to express the inability to participate in an instant messaging session is required. Using the XMPP XEP-0115: Entity Capabilities standard, a "nochat" capability can be expressed. When another XMPP station sees and recognizes this capability, it will disable the option to initiate an instant messaging session to that appliance. There is thus a better user experience because options are not presented that might result in users initiating unsuccessful transactions. By preventing an instant messaging session from starting the user is not left wondering why an instant message was seemingly ignored when in fact it was delivered to a system that was unable to handle the message in the expected manner.

In general, basic presence may be expressed as one of the following states: available, away, extended away, do not disturb, and unavailable states. Also, it should be understood that new states of presence may be added to convey states of a conference room system (video/audio conferencing device) as extended presence information. The typical individual presence states such as: busy, available, idle etc, may be extended to include new states that are tailored to a multi-user conference room including, but not limited to, three exemplary new states. A new first state can represent a "meeting in progress" to indicate that the conference room is in a conference call. Additional information like the meeting name, chair person or duration of the meeting can also be maintained as a data item associated with this state. A new second state can indicate a particular conference room is "scheduled for a meeting." This second state can provide an indication that the conference room is currently not in use but a meeting is scheduled for this corresponding time. Again additional supporting data can be associated with this state. A new third state can indicate "meeting room is full." This third state can inform others that the associated conference room has reached its maximum limit for the number of calls it can support or can indicate that all expected calls for the corresponding conference have been received. Additionally, some newly defined states can be dynamically determined based on information inherently known by the conferencing device itself.

In the context of a video conference, extending presence information and associating this extended presence information with devices and participants of a video conference may provide participants with additional information useful in scheduling and participating in the conference. For example, properties of conference rooms, properties of equipment, and availability of resources may aid in scheduling appropriate resources to facilitate a conference. Also, maintaining properties of people associated with a conference may aid meeting participants during a conference. For simplicity each of these examples will be discussed separately below. However, it should be recognized that these examples may be combined with each other or with other data provided via extended presence information. Also note, not every device, room or person may be configured to provide its own presence information. Therefore, it may be possible to associate a device with each real world entity to act as a proxy in advertising the extended presence information for an entity.

Properties of a physical conference room that may be advertised via extended presence information include the maximum occupancy of the room and the type of videoconferencing system with which the room is equipped. A room may also be equipped with a specific type and model of a video conferencing system. For example, the room may be configured with a system comprised of a particular number of monitors or the room may be configured with an immersive telepresence system and configuration. The number of monitors may be important if the meeting scheduler is planning to present something visually (e.g., presentation, document, diagram) and would like to be able to display the image concurrently with an image of live video. An immersive telepresence system is one which provides a natural, "across the table" experience because meeting participants are shown in true-to-life dimensions. One example of an immersive telepresence system is the Polycom RPX HD 400 Series available from Polycom Inc., Pleasanton, Calif.

Properties of supporting equipment can also be advertised via extended presence information to indicate the quality of video experience available. For example, if the system is capable of supporting high definition video or high fidelity audio. This may be important to the meeting scheduler if the conference material will include audible or visual content requiring precise reproduction at the remote sites. Also, the number and type of audio/visual (A/V) aids or interfaces available to the supporting equipment can be advertised. This may be useful if the presentation materials rely on collaboration with multiple input/output (I/O) devices. Additionally, supporting equipment capabilities which may be useful to advertise may include but not be limited to capacities of equipment (as in the maximum number of calls which can be placed), ability to service certain protocols (e.g., IP, ISDN, POTS, etc.), ability to provide bridging capabilities, and ability to place ad-hoc conferences.

Scheduling information for conference entities can also be advertised via extended presence information. This need not be limited to the scheduling information about meeting invitees, but can also include information about physical conference room schedules and equipment schedules. This may prevent two meeting organizers from scheduling coinciding "large" conferences which might have the potential of overloading the bridging capacity available at a particular time. Also, scheduling and location of a portable multi-user device that can be moved from one physical conference room to another, such as a movie projector, can be provided to a presence server via extended presence information. A meeting organizer can interface to a scheduling system via an end user interface device such as, but not limited to, a personal computer, personal data assistant (PDA), cellular phone, etc.

During a conference, extended personal presence information (i.e., information about a person invited to the meeting) can be used to track the location and status of a meeting invitee. For example, the extended personal presence information can indicate if the meeting invitee is actually participating in the meeting or if they are currently absent. Updating this information in near real-time can also aid in efficiency and potentially security of a meeting. With near real-time update, participants are able to determine a new person has joined the conference. This can be particularly important for efficiency if a key person arrives late and something important to the discussion had to be previously suspended because the key person was not yet in attendance. From a security perspective this may be useful if the newly arrived person is an uninvited participant. Current systems typically only notify the participants when a new "far end" joins the conference, and no notification is given if another individual arrives at an already connected "far end."

Figure 1:
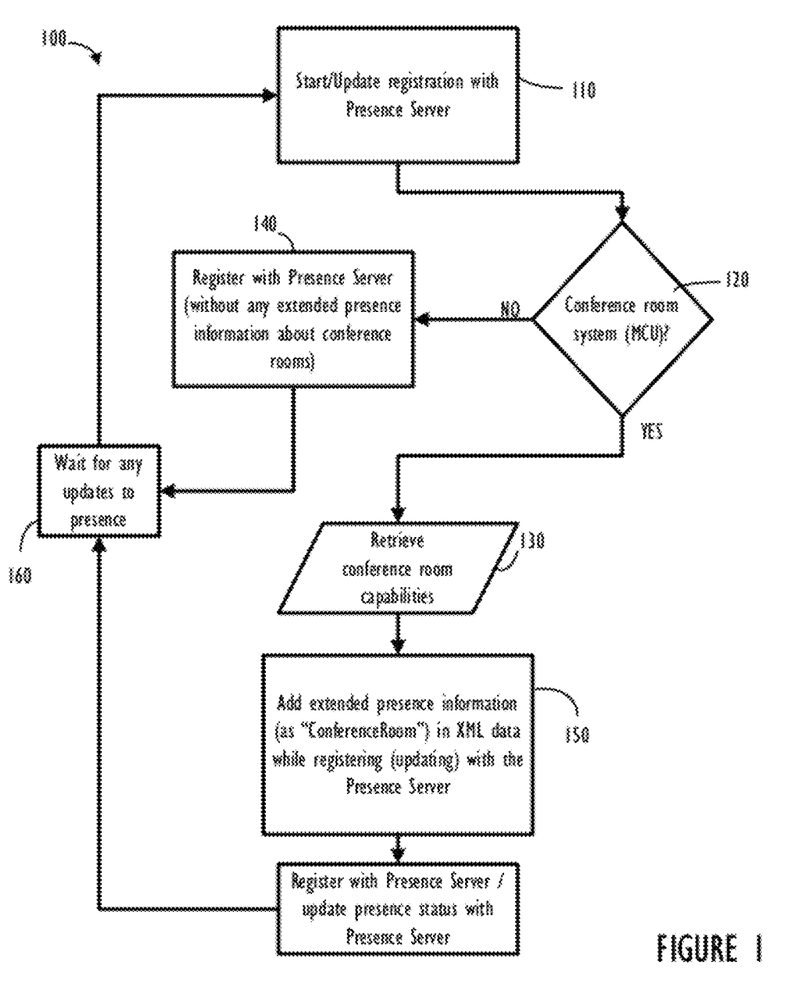
FIG. 1 shows, in flowchart form, a process for collecting and updating extended presence information.

Referring now to FIG. 1, an embodiment of a method for providing extended presence information is shown. Process 100 includes the ability to convey capabilities of a physical conference room as extended presence information (block 130). While traditional models of presence are typically modeled around individual accounts, extended presence information can be used to convey the "group nature" (i.e., used by multiple individuals simultaneously) of multi-user conferencing devices. A video conference system or speaker phone can be configured to convey information related to the capabilities of the physical conference room associated with that device, which in turn may help a user understand the physical conference room's properties when choosing a physical conference room to meet the user's conferencing requirements.

Conferencing systems can advertise their capabilities or parameters of an associated physical conference room in a presence message (defined as per XEP 0115 extensions to XMPP) as in the following example.

```
<c xmlns='http://jabber.org/protocol/caps'
    node='http://polycom.com/xmpp/client/caps'
    ver='0.0.1'
    ext='ConferenceRoom-v1, Size(Large)-v1,
Quality(HighDefinitionVideo)-v1,
    A/VAids(FourMonitorSupport, Projector)-v1,
    Transport(H.323,SIP,H.320,POTS)-v1,MaxCalls(8)-v1'
>
```

As can be seen from the bold text the example above, this presence message is for a "Large" conference room with high definition (HD) video support. The conference room contains audio/visual (A/V) aids of four monitors and a projector. The transport capabilities supported in the conference room include the protocols H.323, SIP, H.320 and POTS. The maximum number of calls which can be concurrently connected to the conference room is eight.

Shown below is an example of how a conference system might advertise its extended presence for the "meeting in progress" state explained above (note the text in bold):

```
<presence xml:lang='en'>
    <show> Meeting in In-Progress in Arboretum Conference Room
    </show>
    <status>Weekly Review Meeting by Bob: From 10 am till 11 am
    </status>
    <status xml:lang='cz'>Ja dvořím Juliet</status>
    <priority>1</priority>
</presence>
```

The (bold faced) show element conveys the information that a meeting is currently in progress in the Arboretum Conference Room. The (bold faced) status element contains the information that the meeting is being conducted by Bob and the meeting will run from 10 to 11.

When video or audio endpoints are enhanced to use the eXtensible Messaging and Presence Protocol (XMPP) standard protocols (RFC 3920 and RFC 3921) to provide standards based presence, the endpoints can also include "buddy list" dialing as a means to improve the user experience. Buddy list dialing allows a user to pick a name, typically from a list of common personal contacts, and call that particular contact. An enhanced calling device can also have some expectation of whether the far end user is available (based on the far end user's presence information) prior to initiating a call. Also, the XMPP standards can provide instant messaging (IM) capabilities for personal computer (PC) endpoints, or other IM capable devices.

Conferencing systems can also advertise their basic "group nature" capability in presence messages. Returning now to FIG. 1, shown is a process 100 for how a Multipoint Control Unit (MCU) can add extended presence information pertaining to a conference room associated with a far end location to a presence server through registration and update. Starting at block 110, control is passed to block 120 where it is determined if this conferencing device (e.g., speakerphone or videoconferencing endpoint) is a device with extended conference room presence information. If not (the NO prong of block 120) control is passed to block 140 and registration proceeds without extended presence information. Flow then continues to block 160 to wait for any changes to the presence status of the device. If the device does have extended presence information (the YES prong of block 120), control is passed to block 150 where the extended conference room presence information is formatted in XML data and registered with the Presence Server. Control is then passed to block 160 to wait for any changes to the presence information. When presence information is detected to have changed at block 160 the process repeats.

After an endpoint indicates their "group nature" and extended presence status, the endpoint can also provide the presence server with a list of present attendees. Optionally the presence server can also display each individual attendee's presence status. This can be implemented with a relationship as that of a parent-child, when the endpoint is associated with a conference room, the conference room could become the parent and the people who are grouped as part of this conference room are expressed as its children. For example, conferencing systems might advertise their extended presence, including participant status as shown in the bolded "member" element, in a nested model (i.e., nested inside the message of the previous example):

```
<presence xml:lang='en'>
    <show> Meeting in In-Progress in Arboretum Conference Room
    </show>
    <status>Weekly Review Meeting by Tom: From 10 am till 11 am
    </status>
    <status xml:lang='cz'>Ja dvořím Juliet</status>
    <priority>1</priority>
<conference room presence>
<member>
        <presence>
        from='tom@polycom.com'
        show>Available</show>
        </presence>
</member>
<member>
        <presence>
        from='dick@polycom.com'
        show>Available</show>
        </presence>
</member>
<member>
        <presence>
        from='harry@polycom.com'
        show>Away</show>
        </presence>
</member>
</conference room presence>
</presence>
```

People who have a meeting scheduled in a conference room can transfer their local presence information by logging their attendance in the conference room or by accepting the invitation for a meeting when they click an "accept/update presence state" icon manually (e.g., just before heading to the conference room). Shown below is an example message whereby a user can initiate a move of an individual's presence status to a group entity such as a conference room. Note the "transfer presence" element in bold. After this message is transmitted far sites who subscribe to such an individual's presence information can receive updates on the new presence status (e.g., the individual's presence information being transferred to a conference room device or a far end location).

```
<presence xml:lang='en'>
    <transfer presence> ABCConferemceRoom@polycom.com </transfer presence>
    <show> Available </show>
    <status>Weekly Review Meeting by Tom: From 10 am till 11 am
    </status>
    <status xml:lang='cz'>Ja dvořím Juliet</status>
    <priority>1</priority>
</presence>
```

Figure 2:
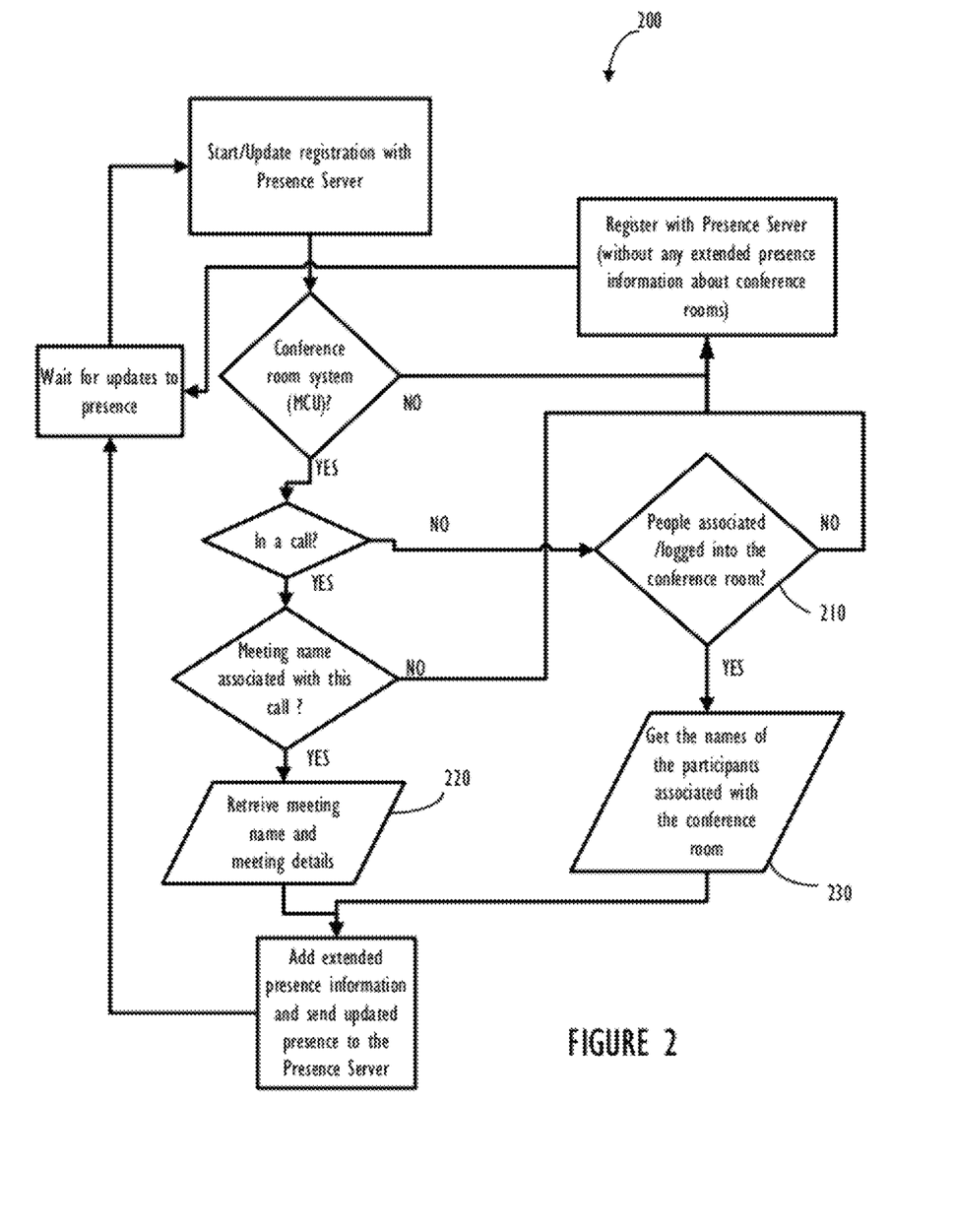
FIG. 2 shows, in flowchart form, a process for collecting and updating information about conference participants.

Referring now to FIG. 2, shown is process 200, an extension to process 100, described above. In this embodiment, the extended presence information for the conference room includes information pertaining to the people associated or logged into the conference room (block 210). Furthermore, the information pertaining to the conference (e.g., name and meeting details) is gathered and provided to the presence server at block 220. Additionally, the names of the people associated with the conference room are gathered and provided to the presence server at block 230. Finally, note that process 200 contains a continuous loop, similar to process 100, allowing for information updates upon any change in presence information for each device or individual associated with a physical location.

Figure 3:
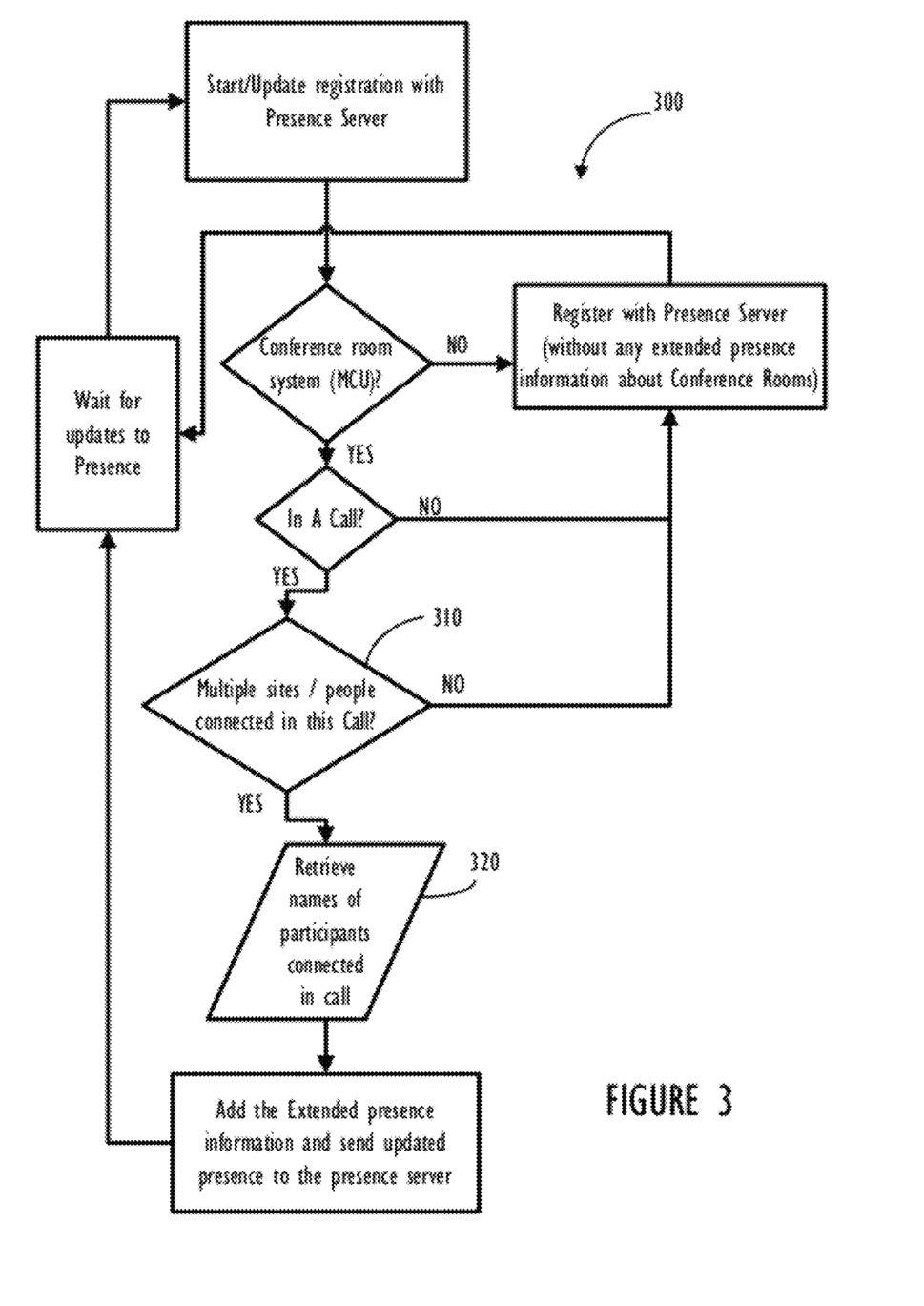
FIG. 3 shows, in flowchart form, presenting local presence as a collection of individual conference attendees.

Referring now to FIG. 3, a further embodiment, process 300, is shown that has the capability to display local presence as a collection of individual conference attendees. In this embodiment, conference room systems can query the "far site display name" of individual endpoints joining the conference room and collectively advertise these far site endpoints as members (via a nested relationship as shown above) and as part of its own extended presence information. In this way a conference can dynamically add, delete or update members (endpoints) in its representation of presence. Therefore, when a set of people connect to the conference, the conference makes a mention of the new participants who have joined the call via a new endpoint as part of that endpoints extended presence information (blocks 310 and 320).

As an example, this would allow an Administrator to find the individuals that are connected (in a call) to the conference from a particular conference room. (As an example to the above, the conference administrator, using XMPP as the presence protocol, might do a reverse look-up of the XMPP JID using the "Far site" display name and thereafter add the XMPP JID as a nested element to its presence information.)

Figure 4:
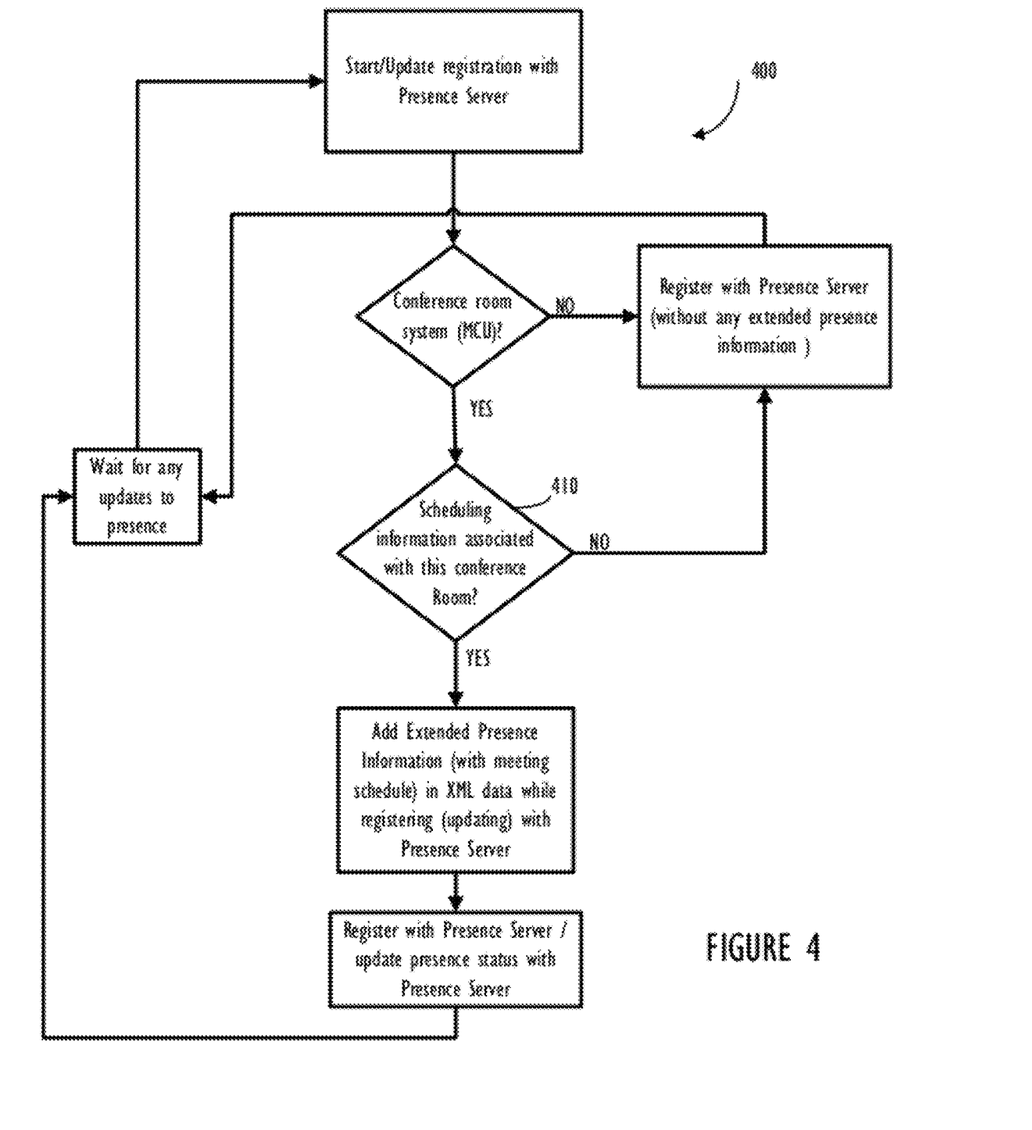
FIG. 4 shows, in flowchart form, including scheduling information as part of the extended presence information.

Referring now to FIG. 4, a further embodiment is shown where process 400 includes the scheduling information associated with the conference room in the conference rooms' extended presence information (block 410). This could be used to convey the schedule of the conference room for the day/week, providing the user with a means to schedule a conference. An example of how a conferencing system might advertise their extended presence in a "schedule" element of an XML message is shown below:

```
<presence xml:lang='en'>
...
    <schedule>
    8 am - 9 am: Free
    9 am - 10 am: Scheduled for a
...
    </schedule>
</presence>
```

Figure 5:
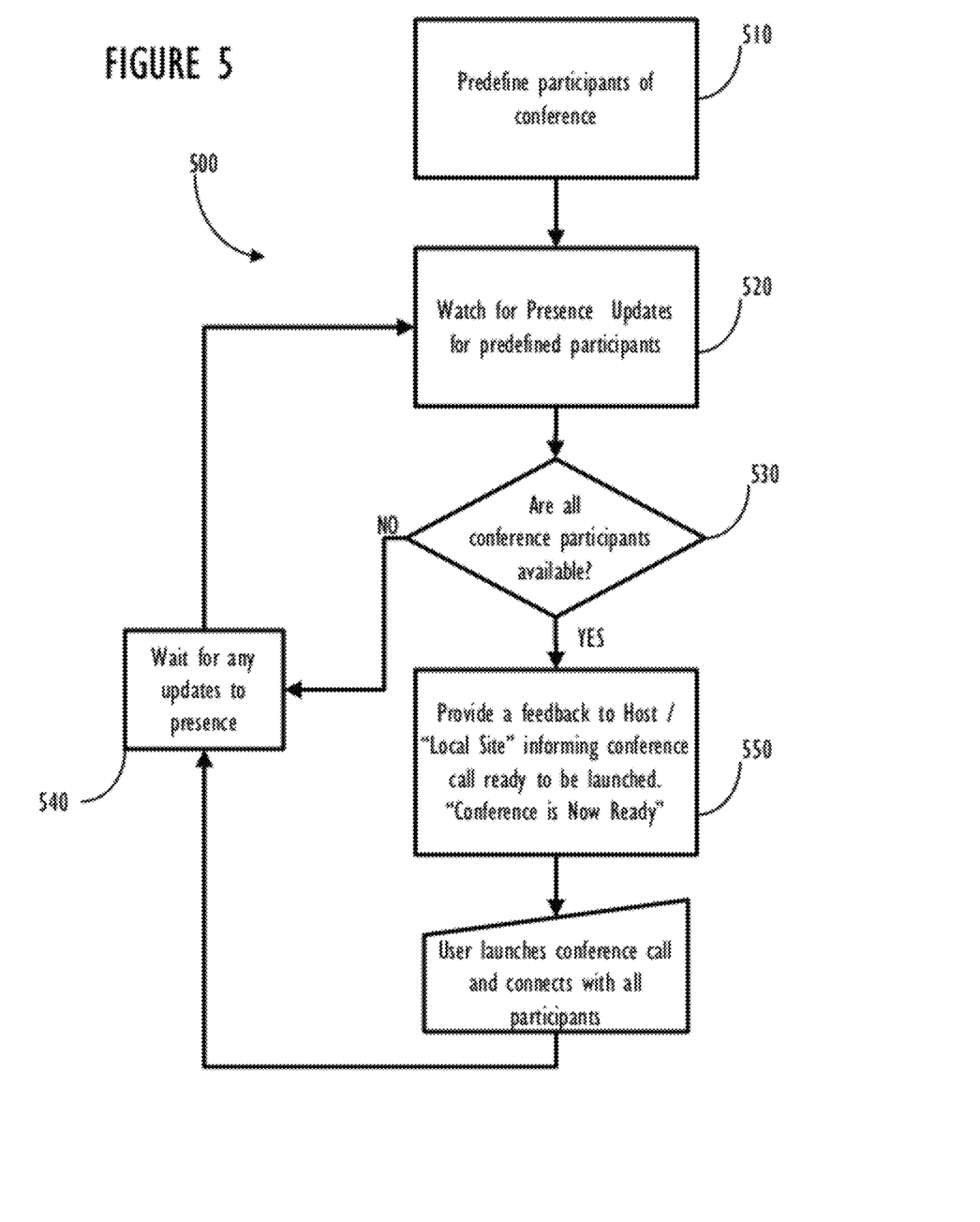
FIG. 5 shows, in flowchart form, a process for launching an ad-hoc conference based on presence information.

Referring now to FIG. 5, an embodiment is shown in process 500 where a set of users may have the ability to launch ad-hoc conference calls based on presence status from the conferencing system either locally or on a remote system. A caller can subscribe to a call (block 510) that will get triggered in the future based on the presence status of each of the endpoints and the predefined participants in the multipoint call. The subscription process can be performed from any device providing a suitable user interface for scheduling a meeting e.g., a personal computer, personal data assistant (PDA), cellular phone, etc. As an example, assume a user wishes to connect to three far site users under a precondition that they all should be available. This user can schedule such a call and wait, the system will watch for presence updates for predefined participants at the loop represented by block 520, 530 and 540. As soon as the system detects that each of the far sites is available (Yes prong of block 530), the system can initiate a pop-up/alert screen to inform the user that the subscribed conference call can now be placed (block 550). A preferred method of implementing this embodiment could utilize endpoint software that tracks the presence states of each of the conference participants and provides a notification to the user who scheduled the call when all desired sites and participants are available.

Figure 6:
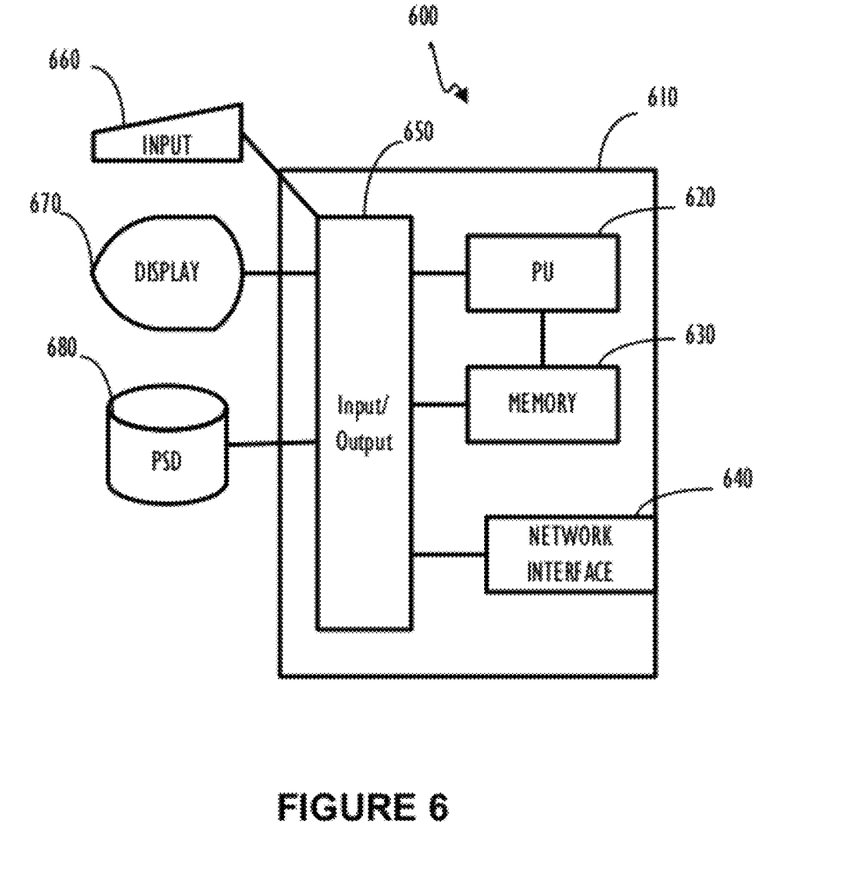
FIG. 6 shows, in block diagram form, a programmable control device comprising a processing unit as may be found in selected corporate devices.

Referring now to FIG. 6, an exemplary conferencing device 600 is shown. Exemplary conferencing device 600 comprises a programmable control device 610 which may be optionally connected to input 660 (e.g., keyboard, mouse, touch screen, etc.), display 670 or program storage device 680. Also, included with program device 610 is a network interface 640 for communication via a network with other conferencing and corporate infrastructure devices (not shown). Note network interface 640 may be included within programmable control device 610 or be external to programmable control device 610. In either case, programmable control device 610 will be communicatively coupled to network interface 640. Also note program storage unit 680 represents any form of non-volatile storage including, but not limited to, all forms of optical and magnetic storage elements including solid-state storage.

Program control device 610 may be included in a conferencing device and be programmed to perform methods in accordance with this disclosure (e.g., those illustrated in FIGS. 1-5). Program control device 610 comprises a processor unit (PU) 620, input-output (I/O) interface 650 and memory 630. Processing unit 620 may include any programmable controller device including, for example, the Intel Core®, Pentium® and Celeron® processor families from Intel and the Cortex and ARM processor families from ARM. (INTEL CORE, PENTIUM and CELERON are registered trademarks of the Intel Corporation. CORTEX is a registered trademark of the ARM Limited Corporation. ARM is a registered trademark of the ARM Limited Company.) Memory 630 may include one or more memory modules and comprise random access memory (RAM), read only memory (ROM), programmable read only memory (PROM), programmable read-write memory, and solid state memory. One of ordinary skill in the art will also recognize that PU 620 may also include some internal memory including, for example, cache memory.

Various changes in the materials, components, circuit elements, as well as in the details of the illustrated operational methods are possible without departing from the scope of the following claims. For instance, acts in accordance with FIGS. 1-5 may be performed by a programmable control device executing instructions organized into one or more modules (comprised of computer program code or instructions). A programmable control device may be a single computer processor (e.g., PU 620), a plurality of computer processors coupled by a communications link or one or more special purpose processors (e.g., a digital signal processor, DSP). Such a programmable control device may be one element in a larger data processing system such as a general purpose computer system. Storage media, as embodied in storage devices such as 680, as well as memory internal to program control device 610, suitable for tangibly embodying computer program instructions include, but are not limited to: magnetic disks (fixed, floppy, and removable) and tape; optical media such as CD-ROMs and digital video disks (DVDs); and semiconductor memory devices such as Electrically Programmable Read-Only Memory (EPROM), Electrically Erasable Programmable Read-Only Memory (EEPROM), Programmable Gate Arrays and flash devices. These are also sometimes referred to as computer readable medium or program storage devices.

Figure 7:
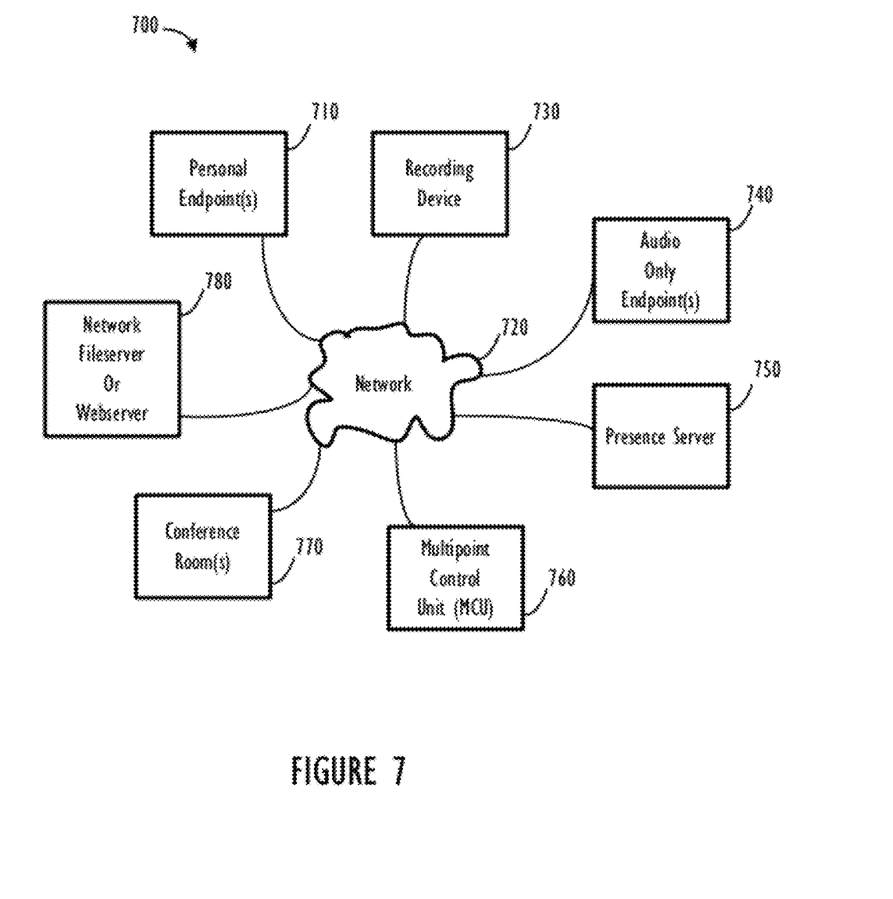
FIG. 7 shows, in block diagram form, exemplary corporate devices communicatively coupled via a network.

In addition, processing unit 600 may be included in one or more of a multiplicity of devices and computer systems coupled through a computer network represented by network 720 as illustrated in FIG. 7. Corporate network 700 comprises multiple computer systems 710 and 730-780 communicatively coupled to each other through network 720. Network 720 represents a plurality of network technologies enabling computers to be communicatively coupled (e.g., LAN, WAN, POTS, Ethernet, TCP/IP, ATM, etc.). Additionally, other supporting devices (not shown) may be communicatively coupled to computer network 700. These supporting devices are known to those of ordinary skill in the art and include, but are not limited to: personal endpoint 710, recording device 730, speaker phone 740, presence server 750, file server or web server 780, network attached storage, printers, etc. Conference room 770 may be associated with a device attached to network 720 to act as a proxy for maintaining the physical conference room presence information. Network 720 could be one or more intranets, one or more extranets (e.g., the Internet) or a combination of both intra- and extranets. In network 700, Multipoint Control Unit (MCU) 760, for example, could include memory for retaining program modules for performing any of the methods illustrated in FIGS. 1-5. Note each of the above described supporting devices may also be combined into a single physical device or combination of devices.

Figure 8:
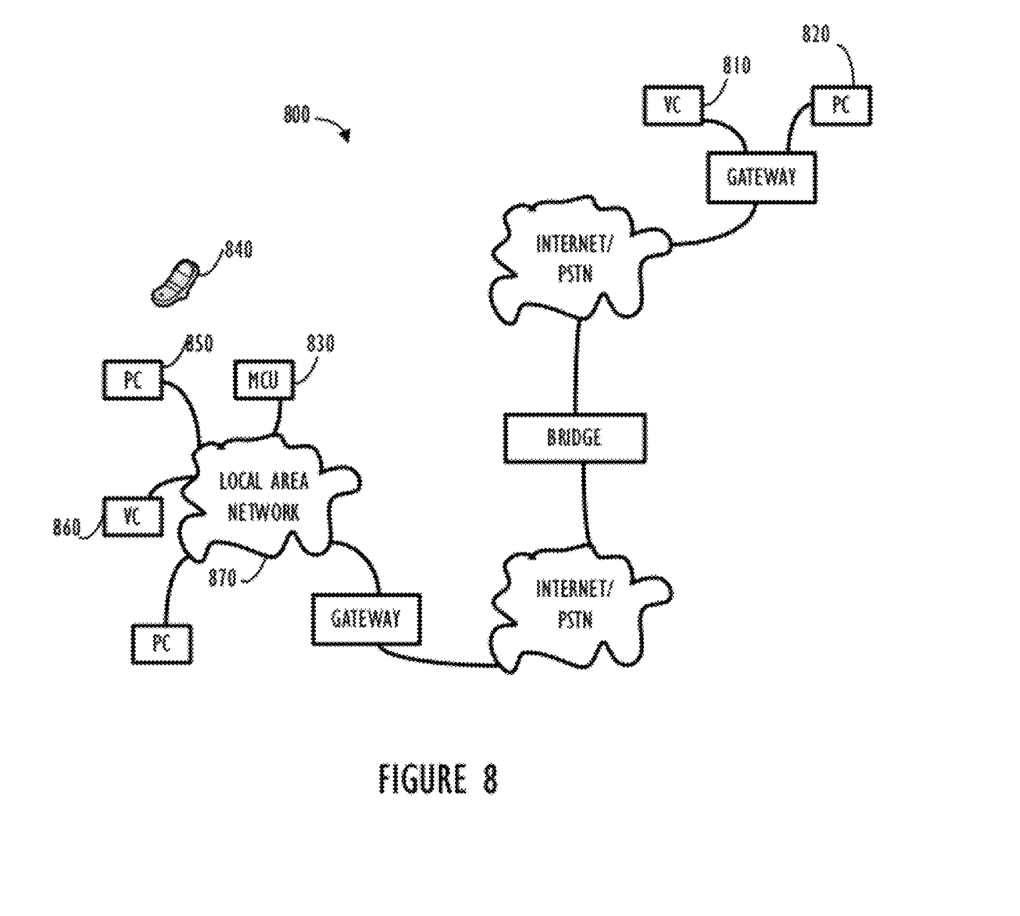
FIG. 8 shows, in block diagram form, exemplary networked devices engaged in a video conference.

Referring now to FIG. 8, a conference 800 is shown to illustrate one embodiment of this disclosure. This example conference is in progress and involves two particular fixed office buildings and a cellular phone 840. Video conferencing equipment 810 and personal computer 820 are located in a first office building while devices connected directly to local area network 870 (i.e., 830, 850 and 860) are located in a second office building. In this example, each of the office buildings is additionally connected via the internet or the Public Switched Telephone Network (PSTN) to the other office building. The user of cellular phone 840 is connected to the conference in an audio only mode via a cellular network (not shown) and not physically located in any conference building at the start of the conference. During the conference the user of cellular phone 840 arrives at the second office building, enters the conference room containing video conferencing equipment 860 and terminates his audio only connection. Video conferencing equipment 860 determines or is notified that there is a change in presence information pertaining to the conference and sends updated extended presence information to a presence server (not shown). The presence server may then process the updated extended presence information to determine if updates need to be transmitted to endpoint devices for user notification. Note, in this case, because the user of cellular phone 840 was already a participant in the conference there may not be any need to transmit notification to endpoint devices. On the other hand, if a completely new person had arrived, transmitting a notification may be desirable.

In the above detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim.

Various changes in the details of the illustrated operational methods are possible without departing from the scope of the following claims. For instance, illustrative flow chart steps of FIGS. 1-5 may perform the identified steps in an order different from that disclosed here. Alternatively, some embodiments may combine the activities described herein as being separate steps. Similarly, one or more of the described steps may be omitted, depending upon the specific operational environment the method is being implemented in. In addition, acts in accordance with FIGS. 1-5 may be performed by a programmable control device executing instructions organized into one or more program modules. A programmable control device may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs").

It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A method executed by a presence server of processing extended presence information associated with one or more conference entities facilitating a conference, the method comprising:

obtaining extended presence information about a plurality of conferencing entities including a first conferencing entity, each of the plurality of conferencing entities facilitating a conference, the plurality of conferencing entities representing conferencing devices or physical facilities;

correlating the extended presence information in a presence server;

monitoring for changes to the extended presence information; and transmitting at least a portion of the changed extended presence information to a conferencing entity selected from the plurality of conferencing entities, the selected conferencing entity different from the first conferencing entity;

wherein obtained extended presence information comprises information about facilities including maximum occupancy of a conference room.

2. A method executed by a presence server of processing extended presence information associated with one or more conference entities facilitating a conference, the method comprising:

obtaining extended presence information about a plurality of conferencing entities including a first conferencing entity, each of the plurality of conferencing entities facilitating a conference, the plurality of conferencing entities representing conferencing devices or physical facilities;

correlating the extended presence information in a presence server;

monitoring for changes to the extended presence information; and transmitting at least a portion of the changed extended presence information to a conferencing entity selected from the plurality of conferencing entities, the selected conferencing entity different from the first conferencing entity;

wherein the first conferencing entity comprises a conference room and the extended presence information contains an indication of the conference room's ability to provide scheduling information.

3. A method executed by a presence server of processing extended presence information associated with one or more conference entities facilitating a conference, the method comprising:

obtaining extended presence information about a plurality of conferencing entities including a first conferencing entity, each of the plurality of conferencing entities facilitating a conference, the plurality of conferencing entities representing conferencing devices or physical facilities;

correlating the extended presence information in a presence server;

monitoring for changes to the extended presence information; and transmitting at least a portion of the changed extended presence information to a conferencing entity selected from the plurality of conferencing entities, the selected conferencing entity diffferent from the first conferencing entity;

wherein the first conferencing entity comprises a conference room and the extended presence information contains an indication of conferencing equipment devices in the conference room.

4. A method executed by a presence server of processing extended presence information associated with one or more conference entities facilitating a conference, the method comprising:

obtaining extended presence information about a plurality of conferencing entities including a first conferencing entity, each of the plurality of conferencing entities facilitating a conference, the plurality of conferencing entities representing conferencing devices or physical facilities;

correlating the extended presence information in a presence server;

monitoring for changes to the extended presence information; and transmitting at least a portion of the changed extended presence information to a conferencing entity selected from the plurality of conferencing entities, the selected conferencing entity different from the first conferencing entity;

wherein the first conferencing entity comprises a conferencing system and the extended presence information contains an indication of number of displays associated with the conferencing system.

5. A method executed by a presence server of processing extended presence information associated with one or more conference entities facilitating a conference, the method comprising:
- obtaining extended presence information about a plurality of conferencing entities including a first conferencing entity, each of the plurality of conferencing entities facilitating a conference, the plurality of conferencing entities representing conferencing devices or physical facilities;
- correlating the extended presence information in a presence server;
- monitoring for changes to the extended presence information; and
- transmitting at least a portion of the changed extended presence information to a conferencing entity selected from the plurality of conferencing entities, the selected conferencing entity different from the first conferencing entity;
- wherein the first conferencing entity comprises a conferencing system with at least one camera and the extended presence information contains an indication of resolution of the camera.

6. A method executed by a presence server of processing extended presence information associated with one or more conference entities facilitating a conference, the method comprising:
- obtaining extended presence information about a plurality of conferencing entities including a first conferencing entity, each of the plurality of conferencing entities facilitating a conference, the plurality of conferencing entities representing conferencing devices or physical facilities;
- correlating the extended presence information in a presence server;
- monitoring for changes to the extended presence information; and
- transmitting at least a portion of the changed extended presence information to a conferencing entity selected from the plurality of conferencing entities, the selected conferencing entity different from the first conferencing entity;
- wherein the first conferencing entity comprises a conferencing system with at least one display and the extended presence information contains an indication of resolution of the display.

7. A method executed by a presence server of processing extended presence information associated with one or more conference entities facilitating a conference, the method comprising:
- obtaining extended presence information about a plurality of conferencing entities including a first conferencing entity, each of the plurality of conferencing entities facilitating a conference, the plurality of conferencing entities representing conferencing devices or physical facilities,
- correlating the extended presence information in a presence server;
- monitoring for changes to the extended presence information; and
- transmitting at least a portion of the changed extended presence information to a conferencing entity selected from the plurality of conferencing entities, the selected conferencing entity different from the first conferencing entity;
- wherein the first conferencing entity comprises a conferencing system with at least one display and the extended presence information contains an indication of size of the display.

8. A method executed by a presence server of processing extended presence information associated with one or more conference entities facilitating a conference, the method comprising:
- obtaining extended presence information about a plurality of conferencing entities including a first conferencing entity, each of the plurality of conferencing entities facilitating a conference, the plurality of conferencing entities representing conferencing devices or physical facilities;
- correlating the extended presence information in a presence server;
- monitoring for changes to the extended presence information; and
- transmitting at least a portion of the changed extended presence information to a conferencing entity selected from the plurality of conferencing entities, the selected conferencing entity different from the first conferencing entity;
- wherein the first conferencing entity comprises a conference room and the extended presence information contains an indication of the conference room video specifications.

9. A method executed by a presence server of processing extended presence information associated with one or more conference entities facilitating a conference, the method comprising:
- obtaining extended presence information about a plurality of conferencing entities including a first conferencing entity, each of the plurality of conferencing entities facilitating a conference, the plurality of conferencing entities representing conferencing devices or physical facilities;
- correlating the extended presence information in a presence server;
- monitoring for changes to the extended presence information; and
- transmitting at least a portion of the changed extended presence information to a conferencing entity selected from the plurality of conferencing entities, the selected conferencing entity different from the first conferencing entity;
- wherein the first conferencing entity comprises a conference room and the extended presence information contains an indication of the conference room audio specifications.

10. A conference communication end user device comprising:
- a programmable control device;
- wherein the programmable control device is configured to:
  - obtain extended presence information about operational capacity of the communication device;
  - transmit at least a portion of the extended presence information to a presence server;
  - monitor for changes in the obtained presence information relative to the communication device; and
  - transmit at least a portion of the changes in the obtained presence information to the presence server;
  - wherein the programmable control device is further configured to further extend the presence information, if the communication end user device is a multi-user device, with one or more properties pertaining to a plurality of users using the multi-user device.

11. The conference communication end user device of claim 10, wherein the programmable control device is further configured to advertise the capabilities of the communication device in XEP 0115 extensions to XMPP.

12. The conference communication end user device of claim 10, wherein the programmable control device is further configured to advertise a lack of capability of the communication device in XEP 0115 extensions to XMPP.

13. The method of claim 1 wherein the extended presence information contains an indication of the conference room's ability to provide scheduling information.

14. The method of claim 1 wherein the extended presence information contains an indication of conferencing equipment devices in the conference room.

15. The method of claim 14 wherein the indication of conferencing equipment devices in the conference room includes an indication of number of displays associated with a conferencing system.

16. The method of claim 14 wherein the indication of conferencing equipment devices in the conference room includes an indication of resolution of a camera associated with a conferencing system.

17. The method of claim 14 wherein the indication of conferencing equipment devices in the conference room includes an indication of resolution of one or more displays associated with a conferencing system.

18. The method of claim 14 wherein the indication of conferencing equipment devices in the conference room includes an indication of size of one or more displays associated with a conferencing system.

19. The method of claim 14 wherein the indication of conferencing equipment devices in the conference room includes an indication of the conference room video specifications.

20. The method of claim 14 wherein the indication of conferencing equipment devices in the conference room includes an indication of the conference room audio specifications.

21. The method of claim 2 wherein the extended presence information contains an indication of conferencing equipment devices in the conference room.

22. The method of claim 21 wherein the indication of conferencing equipment devices in the conference room includes an indication of number of displays associated with a conferencing system.

23. The method of claim 21, wherein the indication of conferencing equipment devices in the conference room includes an indication of resolution of a camera associated with a conferencing system.

24. The method of claim 21 wherein the indication of conferencing equipment devices in the conference room includes an indication of resolution of one or more displays associated with a conferencing system.

25. The method of claim 21 wherein the indication of conferencing equipment devices in the conference room includes an indication of size of one or more displays associated with a conferencing system.

26. The method of claim 21 wherein the indication of conferencing equipment devices in the conference room includes an indication of the conference room video specifications.

27. The method of claim 21 wherein the indication of conferencing equipment devices in the conference room includes an indication of the conference room audio specifications.

28. The method of claim 3 wherein the indication of conferencing equipment devices in the conference room includes an indication of number of displays associated with a conferencing system.

29. The method of claim 3 wherein the indication of conferencing equipment devices in the conference room includes an indication of resolution of a camera associated with a conferencing system.

30. The method of claim 3 wherein the indication of conferencing equipment devices in the conference room includes an indication of resolution of one or more displays associated with a conferencing system.

31. The method of claim 3 wherein the indication of conferencing equipment devices in the conference room includes an indication of size of one or more displays associated with a conferencing system.

32. The method of claim 3 wherein the indication of conferencing equipment devices in the conference room includes an indication of the conference room video specifications.

33. The method of claim 3 wherein the indication of conferencing equipment devices in the conference room includes an indication of the conference room audio specifications.

34. The method of claim 4 wherein the extended presence information further contains an indication of resolution of one or more displays associated with a conferencing system.

35. The method of claim 4, wherein the extended presence information further contains an indication of size of one or more displays associated with a conferencing system.

* * * * *